(12) United States Patent
Lawall et al.

(10) Patent No.: US 7,784,819 B2
(45) Date of Patent: Aug. 31, 2010

(54) AIRBAG SYSTEM

(75) Inventors: Jennifer P. Lawall, Waterford, MI (US); Diane K. McQueen, Leonard, MI (US); Steven E. Morris, Fair Haven, MI (US); Alan L. Browne, Grosse Pointe, MI (US); Nancy L. Johnson, Northville, MI (US); Scott D. Thomas, Novi, MI (US); Kenneth A. Strom, Washington, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/030,983

(22) Filed: Feb. 14, 2008

(65) Prior Publication Data

US 2009/0206581 A1 Aug. 20, 2009

(51) Int. Cl.
B60R 21/20 (2006.01)

(52) U.S. Cl. .................. 280/728.3; 280/730.2; 280/735; 280/743.2

(58) Field of Classification Search .............. 280/728.1, 280/728.3, 730.2, 735, 743.2
See application file for complete search history.

(56) References Cited

U.S. PATENT DOCUMENTS

| 5,080,393 | A | * | 1/1992 | Dixon et al. ................. 280/732 |
| 5,805,058 | A | * | 9/1998 | Saito et al. ................... 340/436 |
| 5,810,389 | A | * | 9/1998 | Yamaji et al. ............. 280/730.2 |
| 5,897,135 | A | * | 4/1999 | Oehm ....................... 280/728.3 |
| 5,927,749 | A | * | 7/1999 | Homier et al. ........... 280/730.2 |
| 6,213,498 | B1 | * | 4/2001 | Ghalambor et al. ...... 280/730.2 |
| 6,299,197 | B1 | * | 10/2001 | Mueller .................... 280/728.3 |
| 6,457,744 | B1 | | 10/2002 | Tonooka |
| 6,848,707 | B2 | * | 2/2005 | Bauer et al. .............. 280/728.3 |
| 6,945,559 | B2 | * | 9/2005 | Kassman et al. ............ 280/735 |
| 7,201,394 | B2 | * | 4/2007 | Mori et al. ................ 280/728.3 |
| 7,311,325 | B2 | * | 12/2007 | Tracht et al. ............. 280/730.2 |
| 2001/0006288 | A1 | * | 7/2001 | Sakakida ..................... 280/735 |
| 2002/0056975 | A1 | | 5/2002 | Yoon |
| 2006/0125218 | A1 | * | 6/2006 | Guth et al. .................. 280/732 |
| 2006/0138751 | A1 | * | 6/2006 | Matsuno .................. 280/728.3 |
| 2007/0057563 | A1 | * | 3/2007 | Taguchi et al. ........... 297/463.1 |
| 2007/0278771 | A1 | * | 12/2007 | Sato et al. ................. 280/730.2 |
| 2008/0224454 | A1 | * | 9/2008 | Tracht ....................... 280/728.3 |

FOREIGN PATENT DOCUMENTS

| JP | 2004034965 A | 2/2004 |
| KR | 20040021915 A | 3/2004 |

* cited by examiner

*Primary Examiner*—Paul N Dickson
*Assistant Examiner*—James English
(74) *Attorney, Agent, or Firm*—Quinn Law Group, PLLC (57) ABSTRACT

An embodiment of an airbag system includes a cavity configured to store an airbag, wherein the cavity has an aperture that provides an outlet for the airbag during deployment. The embodiment also includes a cover releasably attached over the aperture via an attachment mechanism having an initial attachment strength. The initial attachment strength is configured to reduce to a release attachment strength in response to receipt of a release signal at the attachment mechanism.

17 Claims, 7 Drawing Sheets

AIRBAG SYSTEM

TECHNICAL FIELD

The present invention relates generally to airbag systems, and more particularly to an attachment mechanism configured to selectively prepare an airbag cover for release from an airbag housing, such as prior to airbag deployment.

BACKGROUND OF THE INVENTION

Current vehicle airbag systems include an inflatable airbag that is positioned in an airbag housing. When inside the housing, a cover is situated over the airbag. The cover may be, for example, an airbag deployment door, seat trim, substrate, or closeout. These covers, which are intended to be permanent and irreversible following airbag deployment, are either integral with the housing or are attached via an attachment mechanism. Exemplary attachment mechanisms may include irreversible stitching, rivets, or threaded fasteners. The portion of the surface acting as the cover is typically demarked by a weakened region around all or a portion of its perimeter, which is not typically visible to the end consumer. The weakened region is designed to fail under airbag loading during deployment, creating an opening through which the airbag may deploy.

The fracture forces necessary to open an airbag cover may experience some level of variation from part to part due to manufacturing and part tolerance differences. The inherent variability of the separation and release of the airbag cover causes variation in both the timing and the manner in which the airbag deploys through the cover. Such variability requires the airbag system to have an inflator with a higher power than may otherwise be necessary to provide accurate and predictable deployment.

As such, it is desirable to control the deployment of an airbag past the airbag cover, reduce the cover fracture forces, and, thus, minimize the required power of the airbag inflator.

SUMMARY OF THE INVENTION

An embodiment of an airbag system includes a cavity configured to store an airbag, wherein the cavity has an aperture that provides an outlet for the airbag during deployment. The embodiment also includes a cover releasably attached over the aperture via an attachment mechanism having an initial attachment strength. The attachment mechanism may include a hook-and-loop type fastener, a knob-and-receiving cavity type fastener, one or more aligning tables, and/or a seam. The seam may consist of stitching that attaches one or more pieces of material, such as fabric or flexible plastic, together. The initial attachment strength is configured to reduce in force level to a release attachment strength in response to receipt of a release signal at the attachment mechanism. The release signal may be transmitted as a voltage, a current, a magnetic field, or a thermal trigger and may be transmitted in response to a preliminary impact condition, an impact condition, or a manual input.

The attachment mechanism may be at least partially formed from a shape memory alloy, a shape memory polymer, an electro active polymer, a piezo electric, a magnetorheological elastomer, and/or an electrorheological elastomer. As such, reducing the initial attachment strength to the release attachment strength may include activating at least one of the shape memory alloy, the shape memory polymer, the electro active polymer, the piezo electric, the magnetorheological elastomer, and/or the electrorheological elastomer. The attachment mechanism may increase substantially from the release attachment strength to the initial attachment strength in response to recognition of a cessation of the receipt of the release signal at the attachment mechanism, a receipt of an attachment signal at the attachment mechanism, or the passing of a predetermined length of time.

If the attachment mechanism is a seam, then reducing the attachment strength to the release attachment strength may include at least substantially weakening the seam. The seam may be at least substantially weakened in at least one location via: a direct fracture by the attachment mechanism, the attachment mechanism pulling on a ribbon system directly sewn into the seam and configured to create at least one high stress point on the system, and/or a lever system on the attachment mechanism configured to multiply a pulling motion on the ribbon system. Further, the system may include a sheath that substantially prevents a cutting mechanism from at least weakening the seam during a state of non-actuation.

An embodiment of a method of activating an airbag system having an airbag housing with a cavity configured to store an airbag deployable by an airbag inflator, the cavity having an aperture providing an outlet for the airbag during deployment, and a cover releasably attached over the aperture via an attachment mechanism having an initial attachment strength includes receiving a release signal at the attachment mechanism. The embodiment also includes reducing the initial attachment strength to a release attachment strength in response to the receipt of the release signal at the attachment mechanism, receiving a deployment signal at the airbag inflator, and deploying the airbag via the aperture.

The method may further include: transmitting, at a first time prior to receiving the release signal at the attachment mechanism, the release signal from a sensing system to the attachment mechanism in response to one of a preliminary impact condition, an impact condition, or a manual input; and transmitting, at a second time prior to receiving the deployment signal at the airbag inflator, the deployment signal from the sensing system to the airbag inflator in response to one of the preliminary impact condition, the impact condition, or the manual input. It is understood that the first time may occur before or substantially at the same time as the second time.

Optionally, the method may include increasing the release attachment strength substantially to the initial attachment strength, after reducing the initial attachment strength to the release attachment strength, in response to a triggering event. As non-limiting examples, the triggering event may include: detection, at the attachment mechanism, of a cessation of receipt of the release signal; a receipt, at the attachment mechanism, of an attachment signal; or a detection, at the attachment mechanism, of a passing of a predetermined length of time.

The above features and advantages, and other features and advantages of the present invention will be readily apparent from the following detailed description of the preferred embodiments and best modes for carrying out the present invention when taken in connection with the accompanying drawings.

DESCRIPTION OF THE PREFERRED EMBODIMENTS

Embodiment(s) of the system and method disclosed herein advantageously provide an improved attachment system for an airbag system cover. Embodiment(s) of the system and method advantageously improve airbag maintenance and/or deployment. It is believed that such a method and/or system may provide for reduced air bag cover breakout forces.

Figure 1:
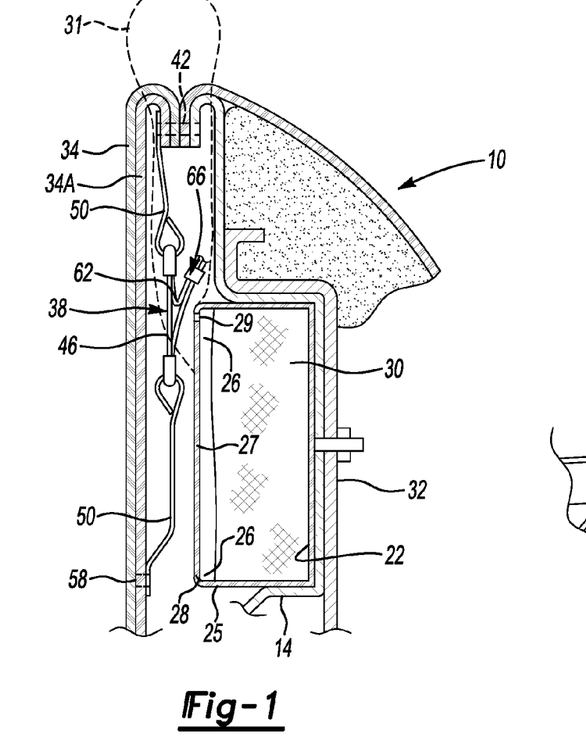
FIG. 1 is a cross-sectional view of an embodiment of the airbag system of the present invention having a tear seam interface.
Figure 2:
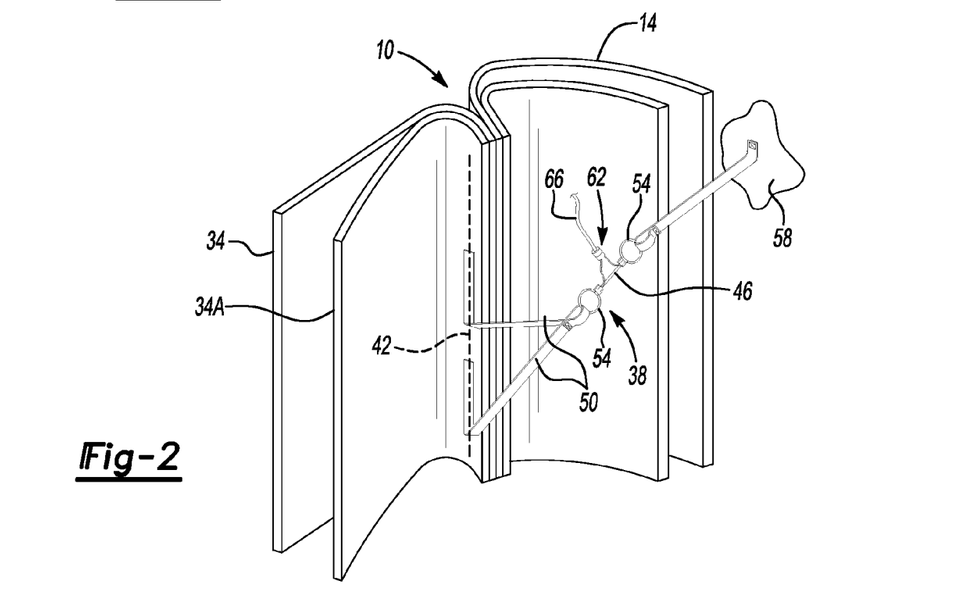
FIG. 2 is a perspective cutaway view of the embodiment of the airbag system of FIG. 1 with the airbag cover partially exploded.

Referring to FIGS. 1 and 2, an embodiment of an airbag system 10 having an airbag housing 14 is depicted. The airbag system 10 is configured for use in a vehicle, such as a car, truck, plane, or boat. As non-limiting examples, the airbag system 10 may be located in the vehicle headliner, quarter panel, instrument panel, steering wheel, door, ceiling, seat, and/or any other suitable packaged vehicle location. The airbag housing 14 may be produced from any suitable materials such as, for example, cloth, plastic, or metal, and may be formed as a solid one-piece housing or from two or more pieces. To maintain positioning, the housing 14 may be attached to another vehicle structure, such as the seat structure 32, or may be formed integral therewith. The airbag housing 14 includes a cavity 22 with an aperture 26. The cavity 22 is configured to house an airbag 30, which selectively deploys via the aperture 26.

A cover 34 is releasably attached over the aperture 26 via an attachment mechanism 38. The cover 34 is attached (either directly or indirectly) to the housing 14 or vehicle structure such as the seat structure 32 and is releasable to create an opening through which the airbag 30 may deploy. As a non-limiting example, the cover 34 may be substantially rectangularly-shaped and attached (either directly or indirectly) to the housing 14 or vehicle structure such as the seat structure 32 along a portion of the perimeter of the cover 34. As such, the cover 34 may be slightly larger than the aperture 26 that it covers. The cover 34 may completely disengage from the airbag housing 14/vehicle structure (e.g., seat structure 32) or may remain partially attached when the cover 34 is released from the housing 14. As an example, where the cover 34 remains attached to the airbag housing 14 even when released therefrom, the cover 34, when released, may function as a flap or a door, allowing a passage for the airbag 30 to deploy while remaining partially attached to the airbag housing 14. The cover may have any suitable configuration and may include one or more layers of material. For example, the embodiment of the cover 34 depicted in FIGS. 1 and 2 has a first cover layer 34 and a second cover layer 34A, which together form the cover 34.

The airbag 30 may optionally be located within airbag packaging 25, which is located in the housing 14. The airbag packaging 25 is formed with a lid 27 attached to the packaging 25 at hinge 28 and releasably attached to the packaging 25 at tear seam 29. Lid 27 acts as an internal cover that will fracture at the tear seam 29 upon airbag 30 deployment, allowing the airbag 30 to escape toward the cover 34 and the fastener 42. A partially deployed airbag 31 is shown in FIG. 1. In this embodiment, aperture 26 is covered by lid 27 before airbag 30 deployment. Upon deployment, the lid 27 opens by tearing at the tear seam 29 and rotating about the hinge 28. This allows aperture 26 to be realized and the airbag 30 to deploy therethrough and approach cover 34. It is to be understood that the packaging 25 and lid 27 and/or the housing 14 may be formed from fabric (i.e., a fabric wrap) that breaks in a controlled fashion upon airbag 30 deployment.

The attachment mechanism 38 includes the fastener 42, which is located at the interface between the housing 14 and the cover 34, and an actuatable material 46. The fastener 42 is the portion of the attachment mechanism 38 that physically retains the cover 34 over the aperture 26. The fastener 42 may be any suitable structure or device that provides for releasable attachment of the cover 34 to the housing 14. As non-limiting examples, the fastener 42 may include a hook-and-loop type fastener, a knob-and-receiving cavity type fastener, one or more aligning tabs, one or more retaining strips, and/or a seam. The seam may consist of the stitching that attaches one or more pieces of material such as fabric or flexible plastic together.

The attachment mechanism 38 has an initial attachment strength, which is a measurement of the amount of force that must be applied to the cover 34 during airbag 30 deployment to release the cover 34 from the airbag housing 14 and provide an outlet for the airbag 30 when the actuatable material 46 is not actuated. This initial attachment strength is, thus, related to the strength of the fastener 42.

The actuatable material 46 may have any suitable composition that is capable of being actuated in a manner to reduce the initial attachment strength to a release attachment strength. As such, the release attachment strength is the amount of force required by the airbag 30 during deployment to release the cover 34 from the housing 14 when the actuatable material 46 is actuated. Upon actuation, the actuatable material 46 may, for example, soften or decrease in length to pre-load or fracture a portion of the fastener 42. Exemplary embodiments illustrating how the actuatable material 46 may lower the initial attachment strength are described hereinbelow. Reducing the initial attachment strength to the release attachment strength advantageously reduces the amount of force that must be exerted by the airbag 30 upon deployment by reducing the amount of force required to release the cover 34 from the housing 14. As such, an airbag system 10 that reduces the initial attachment strength to the release attachment strength may enable an airbag 30 inflator with a lower power than would be necessary for a system 10 that maintains the initial attachment strength during deployment.

The actuatable material 46 may be included in the fastener 42 or may be separate therefrom. As non-limiting examples, the actuatable material 46 may be at least partially formed from: a shape memory alloy (SMA), which may involve cutting or pulling the material 46; a shape memory polymer (SMP), which may include softening the material 46; an electro active polymer (EAP), which may involve pulling the material 46; a piezo electric; a magnetorheological (MR) elastomer; or an electrorheological (ER) elastomer. It is to be understood that actuation of the actuatable material 46 may be triggered by any suitable release signal. The release signal may be transmitted as, for example, a voltage, a current, a magnetic field, or a thermal trigger (e.g., thermal activation or heating of the material 46).

When the release signal is transmitted as a thermal trigger, the actuatable material 46 may be thermally activated, whereby heat is applied to the material 46 in a quantity sufficient to raise the temperature of the thermally active actuatable material 46 (e.g., a shape memory alloy or a shape memory polymer). Heating of the actuatable material 46 may be achieved by any suitable means, including resistive heating, inductive heating, and/or convective and conductive heat transfer from a hot gas or hot fluid, respectively. As a non-limiting example, heat may transfer to the actuatable material 46 from the relatively hot gas that results from a pyrotechnic charge.

The airbag cover 34 may be released in any suitable manner, such as: decreasing the attachment strength of a solid non-stitched seam system, irreversibly fracturing a solid non-stitched seam, decreasing the attachment strength of a stitched seam (i.e., pre-loading the fastener 42 to require less additional load to fracture the seam), irreversibly fracturing a stitching material, and irreversibly fracturing the material in a stitched seam.

Exemplary methods of decreasing the attachment strength of a solid non-stitched seam system include: reversibly reducing the actuatable material 46 modulus (e.g., heating of an SMP or SMA in super elastic mode); reversibly or irreversibly (depending upon the seam material) thinning the actuatable material 46 or decreasing the amount of additional energy needed to fracture the seam material (e.g., using field activated movement of a SMA, piezo electric, or EAP to stretch the material 46); and displacing rigid supporting elements adjacent the seam either reversibly (so only a few supports or support sections are engaged) or irreversibly.

Irreversibly fracturing a solid non-stitched seam may be achieved through tensile fracture of the cover 34 by activation of a SMA, piezo electric, or EAP. As an example, a SMA may be embedded within or attached to the inward-facing surface of the cover 34.

Figures 12, 12A, 12B:
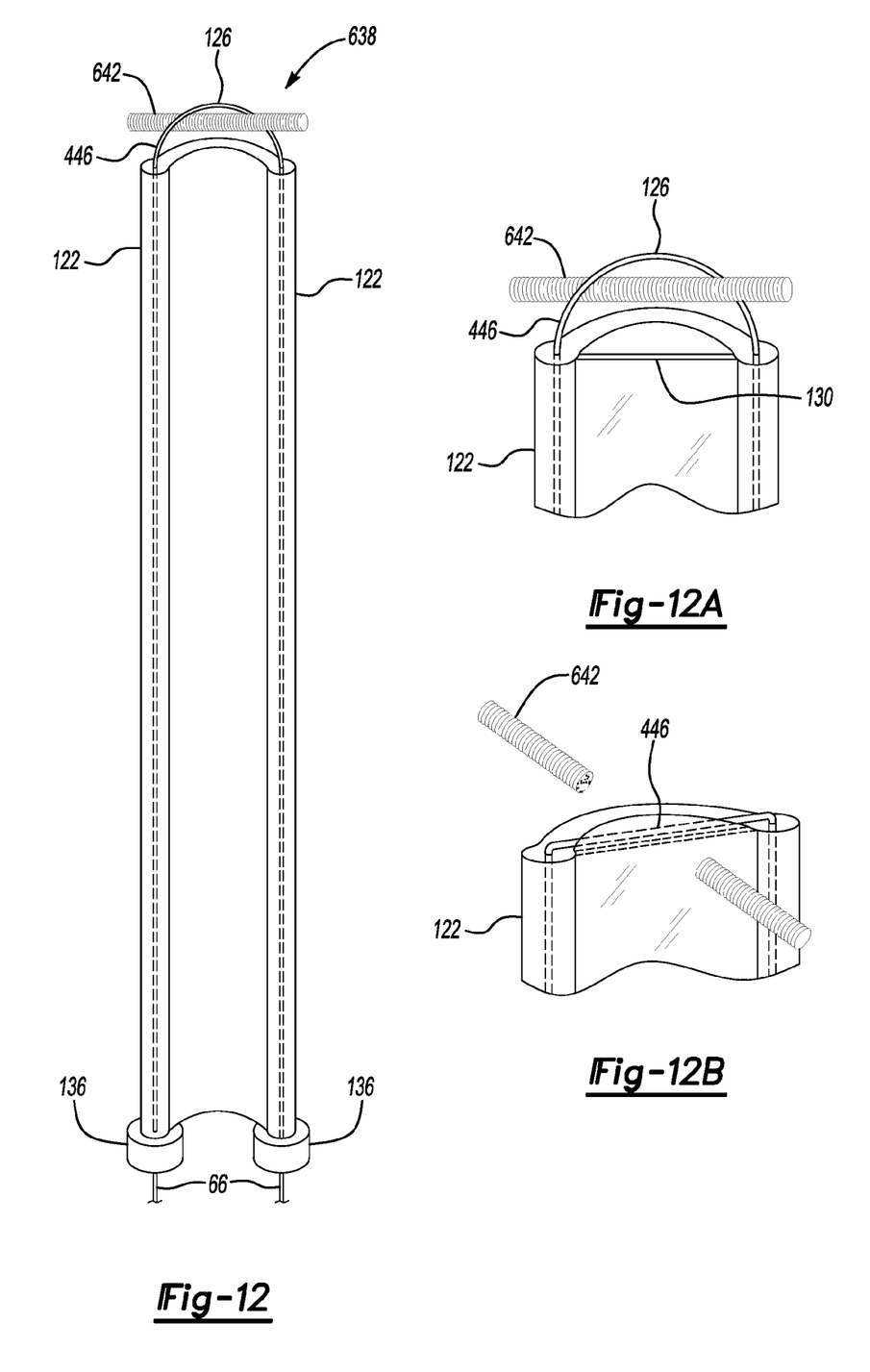
FIG. 12 is a perspective view of an embodiment of a seam cutter selectively operable by the actuatable material of the present invention.
FIG. 12A is an enlarged perspective view of the seam cutter of FIG. 12 wherein the actuatable material is not actuated.
FIG. 12B is an enlarged perspective view of the seam cutter of FIG. 12 wherein the actuatable material is actuated.

Exemplary methods of decreasing the attachment strength of a stitched seam include: reversibly reducing the modulus of the seam (e.g., heating of an SMP or SMA in super elastic mode); activating the shape memory effect and increase in modulus of a SMA seam whereby the cover 34 is pinched or cut proximate to the stitches; and activating SMA, EAP, and/or piezo electric materials to cause crimps 136, shown in FIG. 12, (formed from or engaged with the actuatable materials 46) to reversibly or irreversibly release the actuatable material 46.

Non-limiting examples of irreversibly fracturing the stitching material include: cutting the seam at one or more points by an embedded cutting mechanism 130, 230, 330, 430, shown in FIGS. 12A and 14 through 15B, activated by a piezo electric, an EAP, or a SMA; stretching the seam past its ultimate stress/strain failure through the activation of a SMA, an EAP, or a piezo electric to which it is physically linked (e.g., in series); and by increasing the tension in the seam sufficiently to cause it to pull out of at least one crimp 136, 236, 336, 436.

A non-limiting example of irreversibly fracturing the material in a stitched seam includes actuating the shape memory effect and increase in modulus of a SMA seam, which results in fracturing the cover 34 and opening and/or initiating a seam proximate to the stitches. More specifically, the SMA seam is a SMA in wire form that is used as stitching material (i.e. a fastener) in a prestretched form. Actuating the SMA both decreases the length of the wire and increases its modulus, which both help the SMA to cut through the more flexible, lower modulus material, through which it is stitched, upon actuation.

Figure 2A:
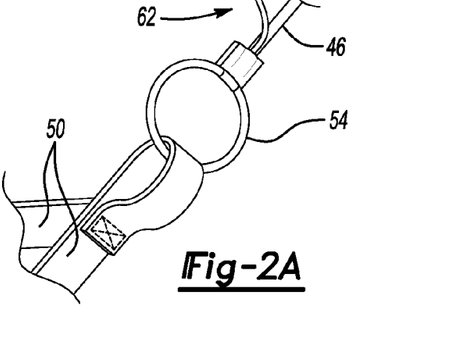
FIG. 2A is an enlarged perspective view of the interface between the actuatable material and the ribbon of FIGS. 1 and 2.

Referring to the specific embodiment of FIGS. 1, 2, and 2A, the fastener 42 is part of a tear seam interface between the cover 34 and the housing 14. More specifically, the fastener 42 is a seam holding together the cover 34, the housing 14, and two ribbons 50. The ribbons 50 are indirectly connected to the actuatable material 46 via the o-ring 54. It is to be understood that any number of ribbons 50 may be utilized and the ribbon(s) 50 may alternately be directly attached to the actuatable material 46. The actuatable material 46 is anchored to a substantially stable fixture or structure 58. Exemplary fixtures/structures 58 include a vehicle body frame, sub frames such as a seat frame or instrument panel, or show surface related components such as the seat trim or the instrument panel show surface/substrate. The actuatable material 46 is also connected to an actuating system 62. In FIGS. 1, 2, and 2A, the actuating system 62 is a power source 64 (depicted in later embodiments) connected to the actuatable material 46 via an electrical connector 66. The actuating system 62 actuates the actuatable material 46 by transmitting electricity to the actuatable material 46 via the electrical connector 66 in response to a release signal. When actuated, the actuatable material 46 decreases in length, causing the ribbons 50 to pull on the fastener 42, which creates at least one high stress point on the seam and causes the seam to weaken or break. Upon air bag 30 deployment, the deploying air bag cushion 30 will contact the cover 34, further breaking the seam if necessary, causing the cover 34 to move away from the seam, and enabling the air bag cushion 30 to deploy through the resulting opening. It is understood that weakening or breaking the seam results in a reduction of the initial attachment strength to a release attachment strength.

The release signal may be transmitted from a sensing system, such as an impact and/or occupant environment sensing system. Inputs to the sensing system may include a roll-over sensor; a gyroscope; one or more accelerometers; a seat belt connection monitor; an occupant sensing monitor such as, but not limited to, an air bag suppression system; and/or a seat position monitor. An impact sensing system may monitor the vehicle for preliminary impact conditions (which warn of a likely impending collision) and/or impact conditions (which indicates a vehicle collision) and may transmit the release signal in response thereto. An occupant environment sensing system may monitor, for example, vehicle seat and mirror positioning as well as passenger seat occupancy, restraint usage, occupant size, and/or occupant position. Alternately, the release signal may be transmitted in response to a manual input, such as by a technician requiring access to the airbag system 10. Allowing manual access to the airbag 30 facilitates removal of the cover 34, for example, for airbag system 10 repair/replacement and/or repair/replacement of components adjacent the air bag system 10. The manual input may be, for example, a button push, a switch toggle, and/or a key turn. It could also be an electronic input provided by an electronic service/diagnostic tool that is plugged into the vehicle. It is recognized that the release signal may prepare the airbag cover 34 for airbag 30 deployment or service access but may not trigger the deployment.

Figure 3:
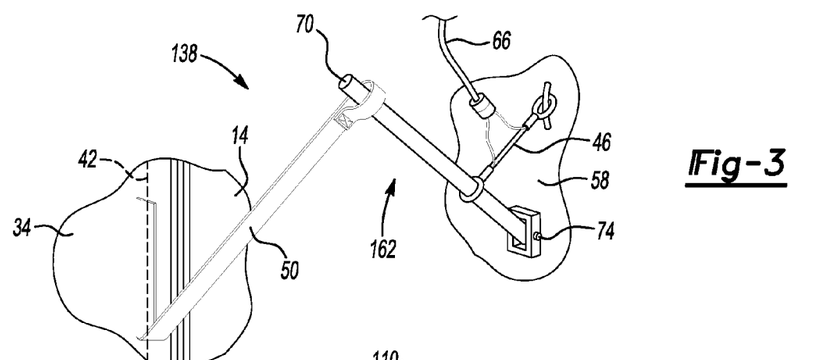
FIG. 3 is a perspective view of another embodiment of an attachment mechanism of the present invention having a tear seam interface with a motion multiplier.

Similar to the embodiment illustrated in FIGS. 1, 2, and 2A, the embodiment of the attachment mechanism 138 illustrated in FIG. 3 includes a fastener 42, which is a seam that connects the cover 34, the housing 14, and a ribbon 50. The ribbon 50 is engaged with a lever arm 70 of the actuating system 162, wherein the lever arm 70 is fixed at a pivot point 74 and attached to the actuatable material 46. The pivot point 74 is located, for example, on the substantially stable fixture or structure 58. The actuatable material 46 is connected to an electrical connector 66, which transmits a release signal to the actuatable material 46. When the actuatable material 46 is actuated, it reduces in length, which pulls on the lever arm 70 and, thus, the ribbon 50, thereby weakening or tearing the seam 42 and reducing the initial attachment strength to a release attachment strength. It is to be understood that the lever arm 70 functions as a motion multiplier, whereby the distance that the ribbon 50 is pulled by the actuatable material 46 is multiplied by the lever arm 70, resulting in a greater distance pulled on the ribbon 50 by the lever arm 70.

In an alternate embodiment, a motion multiplier may utilize a spool having at least two diameters whereby at least a portion of the actuatable material 46 routes around a portion of the spool having a relatively small diameter and where the ribbon 50 routes around a portion of the spool having a relatively large diameter. In this configuration, when the actuatable material 46 changes length (decreases during actuation or increases in response to deactivation), the spool rotates, causing the actuation of the actuatable material 46 to be effectively multiplied as realized by the ribbon 50.

Figure 4:
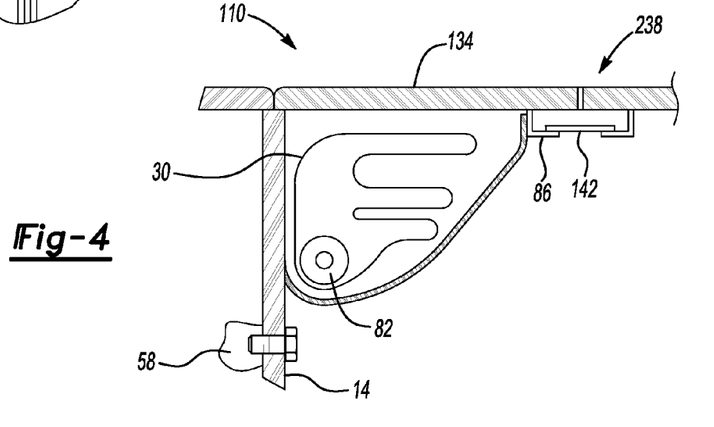
FIG. 4 is a cross-sectional view of an embodiment of an airbag system utilizing an attachment mechanism having a plurality of aligning tabs.
Figure 5:
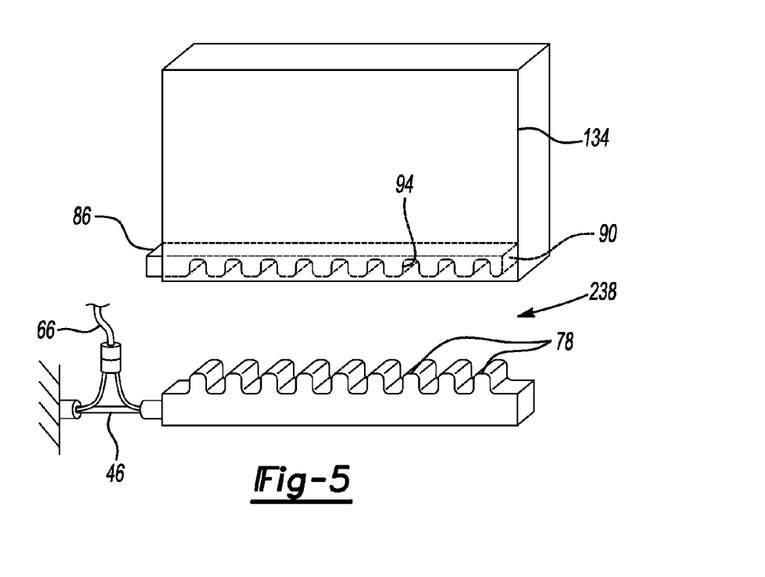
FIG. 5 is a semi-perspective exploded view of the attachment mechanism of FIG. 4.

Referring to FIGS. 4 and 5, an embodiment of an airbag system 110 is depicted having an attachment mechanism 238 utilizing a plurality of aligning tabs 78. In alternate embodiments any number of aligning tabs 78 may be utilized. The system 110 includes an airbag 30 in a housing 14, which is fixed to a substantially stable fixture or structure 58, such as an instrument panel beam. The airbag 30 is in communication with an inflator 82, which selectively receives a deployment signal from a sensing system, such as an impact and/or occupant environment sensing system. The deployment signal may be transmitted in response to a preliminary impact condition, an impact condition, and/or a manual input. As an example, the deployment signal may trigger a pyrotechnic charge, which deploys the airbag 30. In response to the deployment signal, the inflator 82 will inflate and, thus, deploy the airbag 30 via the aperture 26.

For the airbag 30 to deploy through the aperture 26, the fastener 142 adjusts to decrease the initial attachment strength to the release attachment strength. The cover 134 of the attachment mechanism 238 includes a ledge 86. The ledge 86 is equipped with a plurality of fingers 90 that are selectively engageable and disengageable with the aligning tabs 78. More specifically, when the actuatable material 46 is in its non-actuated state, the aligning tabs 78 align with the fingers 90, resulting in a relatively high initial attachment strength and substantially prevents the cover 134 from opening away from the housing 14. When the actuatable material 46 is actuated, such as by a signal transmitted via the electrical connector 66, the actuatable material 46 reduces in length, which slides the aligning tabs 78 with respect to the fingers 90. While the actuatable material 46 is actuated, the aligning tabs 78 misalign with the fingers 90 such that the aligning tabs 78 are aligned with the spaces 94 between the fingers 90. When the aligning tabs 78 are misaligned with the fingers 90, the resulting release attachment strength is lower than the initial attachment strength, and the cover 134 may release from the housing 14, allowing deployment of the airbag 30 through the aperture 26 once the airbag 30 is commanded to deploy and the air bag cushion starts to expand and pushes on the cover 134.

Figure 6:
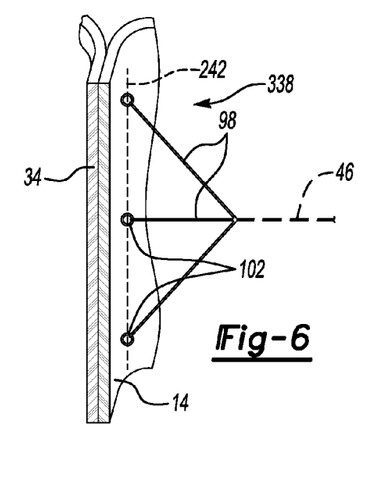
FIG. 6 is a cross-sectional perspective view of an embodiment of the fastener of the present invention having seam release tethers.

Referring now to FIG. 6, the attachment mechanism 338 of the present invention may have a plurality of seam release tethers 98 engaged with the seam. The seam release tethers 98 may be of any shape or composition able to suitably engage the seam. While three seam release tethers 98 are shown in FIG. 6, it is to be understood that any number of tethers 98 may be utilized. In the embodiment of FIG. 6, the fastener 242 is a seam running through a ring 102 of each of the seam release tethers 98 and releasably holding the airbag cover 34 to the housing 14. In one embodiment, the seam release tethers 98 are composed of the actuatable material 46, whereby the tethers decrease in length (i.e., actuate) in response to a release signal. Decreasing the length of the seam release tethers 98 creates at least one high stress point on the seam (i.e., at the points where the seam passes through each ring 102). It is to be understood that the high stress points result in a release attachment strength, which is lower than the initial attachment strength realized by the fastener 242 before actuation. The release attachment strength may occur due to a non-fractured seam having a high tension (i.e., pre-loading) or may be due to a fractured seam.

Alternately, the seam release tethers 98 may be formed of a substantially static (i.e., non-elastic) material that is engaged with the actuatable material 46. As such, actuation results in a decrease in length of the actuatable material 46, which pulls on the seam release tethers 98 and creates one or more stress points in the fastener 242.

Figure 7:
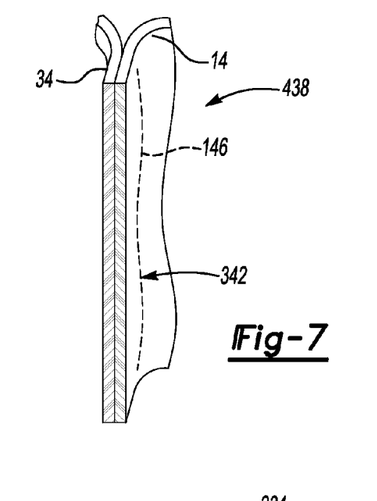
FIG. 7 is a cross-sectional perspective view of another embodiment of fastener of the present invention having an actuatable seam.

Referring now to FIG. 7, a fastener 342, which is a seam at least partially formed from the actuatable material 146, is depicted releasably connecting the airbag cover 34 to the airbag housing 14. It is to be understood that the actuatable seam is depicted in an exaggerated sense of looseness for illustration purposes only. The seam has an initial attachment strength when the actuatable material 146 in the seam is not actuated. In response to a release signal, the actuatable material 146 reduces in length, thereby putting the seam in high tension and reducing the initial attachment strength to a release attachment strength.

The cover 34 and/or the housing 14 may optionally be at least partially composed of an actuatable material 46, such as a shape memory polymer, where the seam passes therethrough. It is to be understood that actuating the actuatable material 46 may soften the shape memory polymer and allow the seam to more easily tear the cover 34 and/or housing 14, thereby reducing the initial attachment strength to the release attachment strength.

In a similar embodiment, the actuatable material 146 in the seam may soften upon actuation. As such, softening the seam results in a decrease in the initial attachment strength to a release attachment strength while allowing for complete reversibility. More specifically, the fastener 342 may reach a release attachment strength in preparation for airbag 30 deployment, but may return to the initial attachment strength if deployment does not occur. In such an event, a release signal is transmitted to the actuatable material, causing the seam to soften. If a deployment signal is not received at the airbag inflator 82 within a predetermined time after receipt of the release signal, the actuatable material 146 may return substantially to its original state, returning the attachment mechanism 438 substantially to the initial attachment strength. As a non-limiting example, the predetermined time may be approximately 10 milliseconds to approximately one minute. Alternately, the actuatable material 146 may remain actuated while continuing to recognize receipt of the release signal and may return, or be commanded to return, substantially to the initial attachment strength in response to a triggering event, such as recognition of a cessation to receive the release signal. In another embodiment, the actuatable material 146 is actuated in response to the release signal and maintains actuation until receiving a subsequent attachment signal from the sensing system at the attachment mechanism 438.

In preparation for and during airbag 30 deployment, two signals may be transmitted: the release signal (which triggers the initial attachment strength to reduce to the release attachment strength) and the deployment signal (which triggers airbag 30 deployment). The release signal and deployment signal may be transmitted substantially simultaneously or the release signal may be transmitted before the deployment signal. It is recognized that separation of the release signal and the deployment signal allows the attachment mechanism 438 to prepare for airbag 30 deployment before the inflator 82 receives the deploy signal inflating the air bag cushion 30 to the point that it pushes on the cover 34 and, if necessary, allows the attachment mechanism 438 to return to the initial attachment strength in the event of non-deployment.

Figure 8:
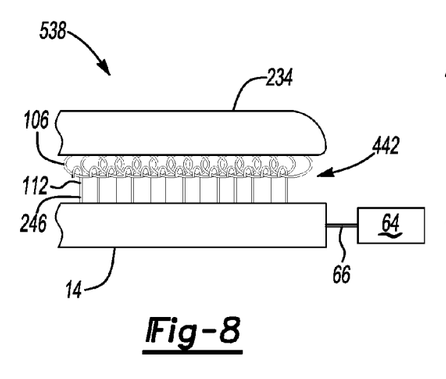
FIG. 8 is a cross-sectional view of another embodiment of the attachment mechanism of the present invention having an actuatable hook-and-loop fastener in the attached position.
Figure 9:
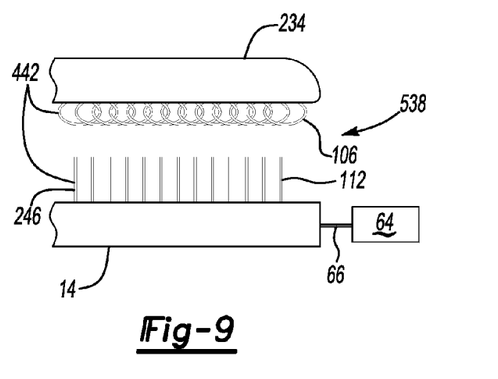
FIG. 9 is a cross-sectional view of the embodiment of the attachment mechanism of FIG. 8 wherein the hook-and-loop fastener is in the released position.

Referring to FIGS. 8 and 9, an attachment mechanism 538 having an actuatable hook-and-loop fastener 442 is depicted. It is recognized that hook-and-loop fasteners 442 are relatively strong in resisting shear and pull-off forces and relatively weak only in resisting peel forces. FIG. 8 illustrates the fastener 442 in the attached position while FIG. 9 shows the fastener 442 in the released position. The cover 234 is equipped with a plurality of loops 106. The loops 106 engage with a plurality of hooks 112 formed from the actuatable material 246 and located on (or in communication with) the housing 14. The actuatable hooks 112 are in communication with a power source 64 via electrical connector 66. Alternately, power source 64 may be a heat source and electrical connector 66 may be a conduit to transfer heat to a thermally actuatable material 246. Upon receipt of a release signal, the power source 64 triggers the actuatable hooks 112 via the electrical conduit 66. In response to the trigger, the actuatable hooks 112 soften or straighten and, thus, release their hook shape, resulting in a release attachment strength. Following recognition of a cessation of the release signal, or in response to an attachment signal, the hooks 112 are no longer actuated and may regain their original hook shape. As such, the release attachment strength may increase substantially to the initial attachment strength.

Alternately, the fastener 442 may include a combination of hooks 112 having two or more actuation levels. For example, the fastener 442 may include hooks 112 that activate at a first temperature and also hooks 112 that activate at a second temperature, which is higher or lower than the first temperature. There may be a larger number of the hooks 112 that actuate at a lower temperature, more of the hooks 112 that actuate at the higher temperature, or substantially equal number of each type of hook 112. Including hooks 112 with varying actuation levels allows the fastener 442 to be actuated to a degree that only some of the hooks 112 are actuated, while the remaining (non-actuated) hooks 112 aid in maintaining the relative position of the cover 234 during actuation.

Figure 10:
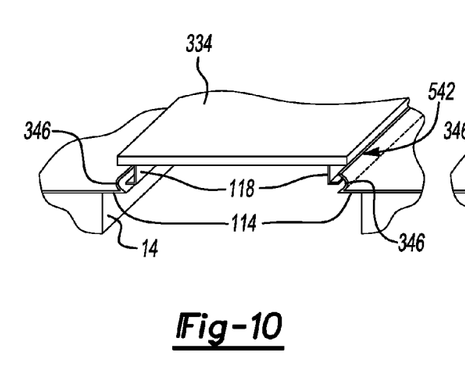
FIG. 10 is a perspective view of an embodiment of the fastener of the present invention having an actuatable retaining strip in the attached position.
Figure 11:
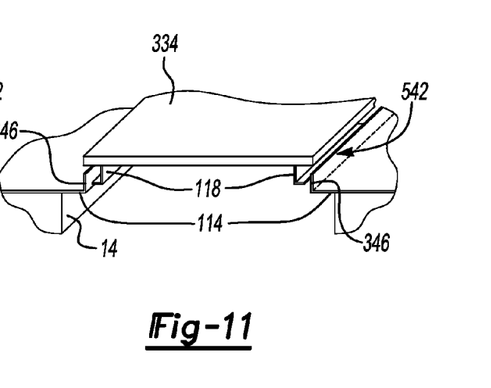
FIG. 11 is a perspective view of the fastener of FIG. 10 in the released position.

Referring to FIGS. 10 and 11, an embodiment of a fastener 542 having a retaining strip 114 including the actuatable material 346 is depicted, wherein the retaining strip 114 is operatively connected to the airbag housing 14. The retaining strip 114 may be formed integral with the housing 14 or may be connected thereto. FIG. 10 illustrates the actuatable retaining strip 114 in the attached position and FIG. 11 shows the actuatable retaining strip 114 in the released position. The retaining strip 114, when in a non-actuated state, engages a lip 118 of the airbag cover 334 and results in an initial attachment strength. Upon activation, the retaining strip 114 softens and, thus, reaches a release attachment strength. If the retaining strip 114 re-attains a non-actuated state, the retaining strip 114 may re-engage the lip 118 and substantially reach the initial attachment strength. Optionally, a portion of the retaining strip 114 may be non-actuatable, whereby the portion remains engaged with the lip 118 when the actuatable lip 118 is disengaged to maintain relative position of the cover 334 to facilitate re-engagement. Alternately, it is to be understood that the actuatable retaining strip 114 may be mounted to the air bag cover 334 and the lip 118 mounted to the housing 14.

Referring to FIGS. 12, 12A, and 12B, the attachment mechanism 638 is embodied as a seam cutter configured to at least substantially weaken the fastener 642. As such, the seam cutter may result in a direct fracture of the fastener 642. The seam cutter includes a guide 122, having any suitable composition (e.g., relatively flexible or relatively inflexible) through which the actuatable material 446 passes. The guide 122 and/or the actuatable material 446 are operatively connected to the housing 14. A loop 126 of the actuatable material 446 extends from the guide 122, through which the fastener 642 passes. It is to be understood that the fastener 642 is formed from an actuatable or non-actuatable material. Extending substantially between the open ends of the guide 122 is a cutting mechanism 130. The actuatable material 446 is connected to an actuating mechanism, such as the electrical connector 66, wherein actuation causes a decrease in the length of the actuatable material 446. When the actuatable material 446 is actuated, the decrease in length causes the loop 126 to retract and pull the fastener 642 against the cutting mechanism 130, which causes the fastener 642 to be substantially weakened or fractured, as is depicted in FIG. 12B. The crimps 136 attached to the actuatable material 446 substantially prevent the electrical connector 66 from being pulled into the guide 122 during actuation of the actuatable material 446. Crimps 136 may be embodied in any suitable form to attach the actuatable material 446 to the electrical connector 66 and/or to prevent the electrical connector 66 from being retracted into the guide 122. Non-limiting examples of the crimp 136 include a wire crimp, soldering, and/or brazing.

It is to be understood that the actuatable material 446 may be at least weakened by the attachment mechanism 638 in any suitable manner. For example, the cutting mechanism 130 may have a relatively sharp cutting edge that the fastener 642 is pulled against when the actuatable material 446 decreases in length. Alternately, the cutting mechanism 130 may have a relatively blunt cutting edge whereby the fastener 642 is at least weakened by the actuatable material 446, which, upon actuation, may act as a fine wire cutting tool and/or may be abrasive against the fastener 642. More specifically, the actuatable material 446 may be substantially fine (i.e., have a very narrow diameter) and may actuate very quickly, which results in a very high contact force against the fastener 642. Additionally, the actuatable material 446 may experience an increase in temperature in response to excess electrical current, which may at least weaken the fastener 642 by softening (e.g., melting) or burning.

It is to be understood that the diameter of a wire-shaped actuatable material 446 may have any suitable diameter, which may vary depending upon, for example, the composition of the material being used. Non-limiting examples of wire diameters range from about 250 microns to about 380 microns, but may range both significantly higher and lower, as desired. In exemplary embodiments, actuation of a wire formed from the actuatable material 446 having a diameter of 250 microns or 380 microns repeatedly produce about 9 N of tension or 19 N of tension (respectively) and produce up to about 36 N or about 76 N of tension (respectively) in a one-time actuation.

To further promote weakening of the fastener 642 by abrasion, one crimp 136 may be configured to yield during actuation. More specifically, during actuation, the actuatable material 446 contracts within the guide 122 toward the crimps 136. If both crimps 136 are fixed, then there is symmetrical contraction of the actuatable material 446 toward the cutting mechanism 130. If one crimp 136 is configured to yield during actuation, then the actuatable material 446 will contract to the cutting mechanism 130 and will then slide against the fastener 642 as the crimp 136 yields, which will increase the abrasion against the fastener 642, substantially creating a "sawing" effect.

Figure 13:
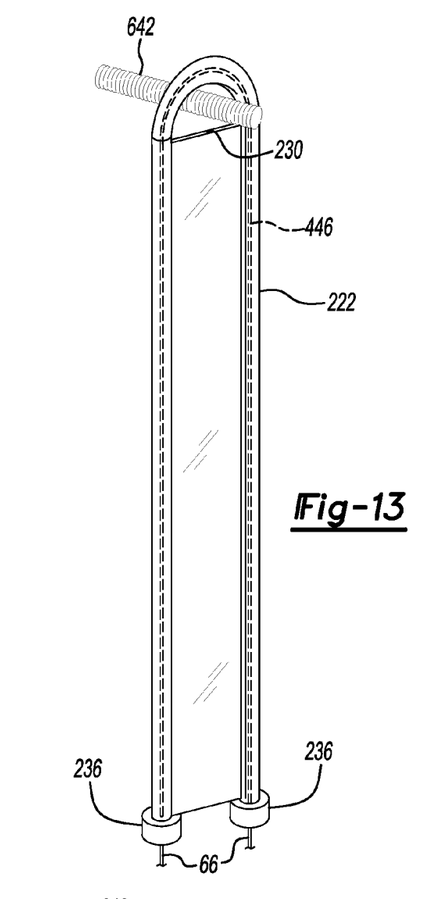
FIG. 13 is a side view of another embodiment of a seam cutter selectively operable by the actuatable material of the present invention.

Similarly, FIG. 13 depicts another embodiment of a seam cutter. The actuatable material 446 passes through the substantially continuous guide 222, which is formed at least partially from a relatively soft and flexible material. For example, guide 222 may be a soft material loop. Guide 222 provides protection for the fastener 642 from the actuatable material 446 during normal, non-actuated use. When actuated, the actuatable material 446 contracts toward the cutting mechanism 130, at least weakening the fastener 642 as described hereinabove with respect to FIG. 12. Such actuation causes the fastener 642 to be substantially weakened or fractured, thereby decreasing the initial attachment strength to the release attachment strength. It is understood that the relatively small diameter of the actuatable material 446, the relatively soft material of the guide 222, and/or the relatively high speed at which the actuatable material 446 contracts allows the actuatable material 446 to cut through the guide 222 near the fastener 642 during actuation. The cutting mechanism 130, 230 may also include a protective sheath or geometric offset such as a bump adjacent the cutting mechanism 130, 230 that substantially prevents the cutting mechanism 130, 230 from inadvertently weakening/fracturing the seam in a non-actuated situation. For example, the sheath/geometric offset may prevent the cutting mechanism 130, 230 from weakening/fracturing the seam in an airbag system 10 located in a vehicle seat during passenger entry and/or egress, which may result in the seam being compressed, pushed, and/or shifted. It is to be understood that the sheath/geometric offset may have any suitable embodiment that substantially prevents the cutting mechanism 130, 230 from at least weakening the fastener 642 during non-actuation.

Figure 14:
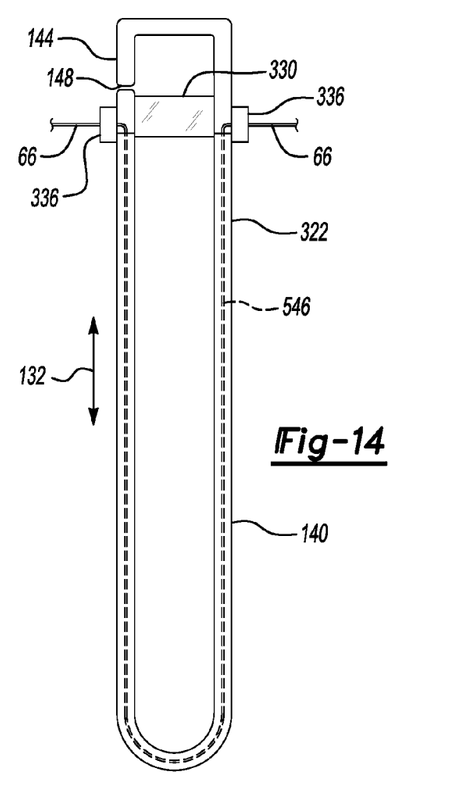
FIG. 14 is a side view of yet another embodiment of a seam cutter selectively operable by the actuatable material of the present invention.
Figure 14A:
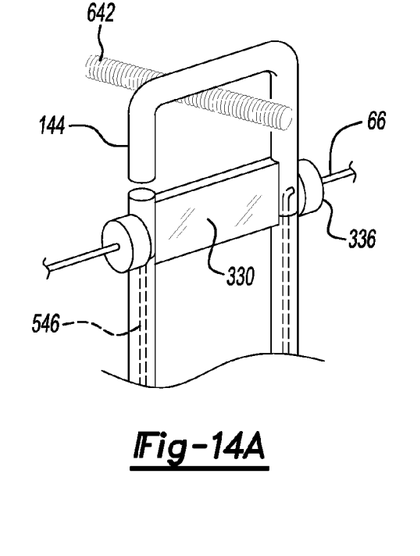
FIG. 14A is an enlarged side view of the seam cutter of FIG. 14 wherein the actuatable material is not actuated.
Figure 14B:
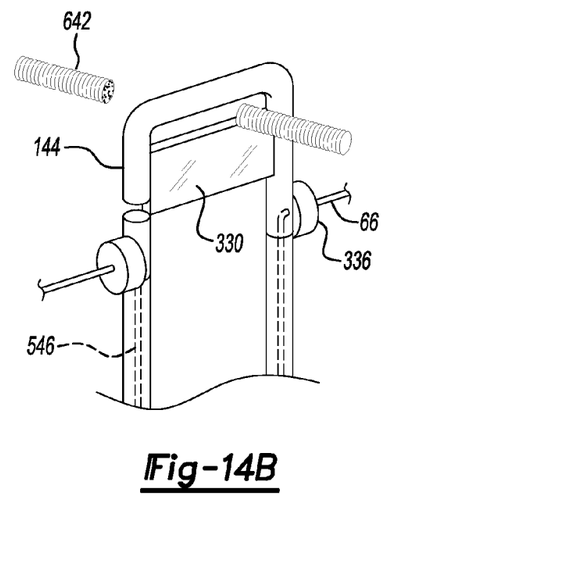
FIG. 14B is an enlarged side view of the seam cutter of FIG. 14 wherein the actuatable material is actuated.

Referring now to FIGS. 14, 14A, and 14B, another seam cutter selectively operated by the actuatable material 546 is depicted. The guide 322 is formed in a case 140, which slidably engages the cutting mechanism 330, wherein the cutting mechanism 330 may slide in the direction indicated by the arrow 132. Upon activation via the electrical connector 66, the actuatable material 546 decreases in length, while the crimps 336 substantially prevent the electrical connector 66 from being pulled into the guide 322. As depicted in FIG. 14B, activation of the actuatable material 546 causes the cutting mechanism 330 to slide toward the fastener 642 and results in the fastener 642 being pinched between the cutting mechanism 330 and the loop 144 of the case 140, resulting in substantial weakening or fracture of the fastener 642. The loop 144 may have an opening 148 to increase the ease in passing the fastener 642 through the loop 144 prior to use.

Alternatively, the actuatable material 546 may attach to the hook shaped loop 144 and, upon actuation, pull it toward the case 140. Such motion either pinching or cutting the fastener 642 as previously described.

Figure 15:
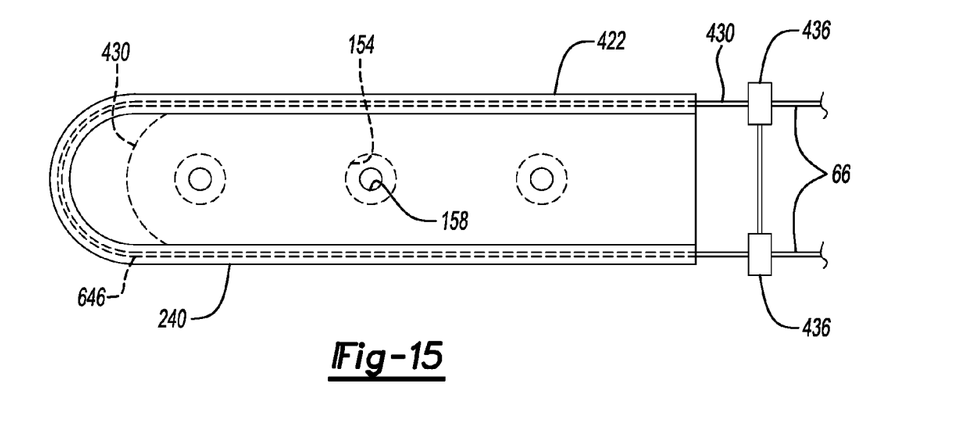
FIG. 15 is a side view of yet another embodiment of a seam cutter selectively operable by the actuatable material of the present invention.
Figure 15A:
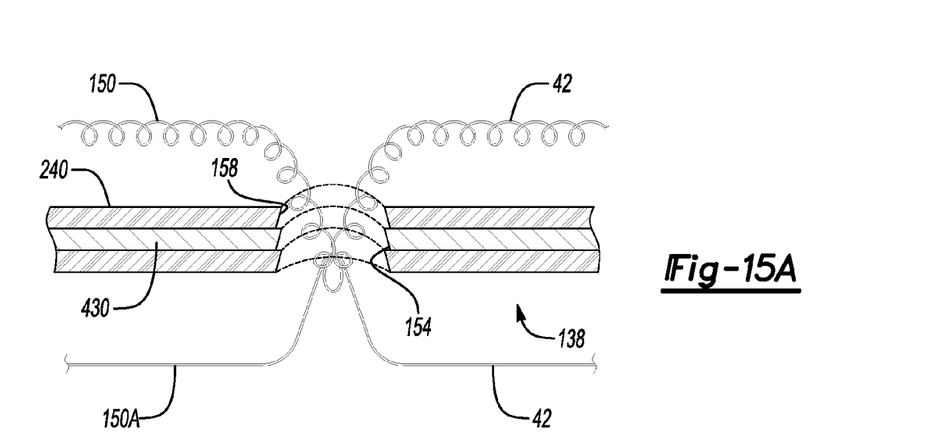
FIG. 15A is an enlarged perspective view of the seam cutter of FIG. 15 wherein the actuatable material is not actuated.
Figure 15B:
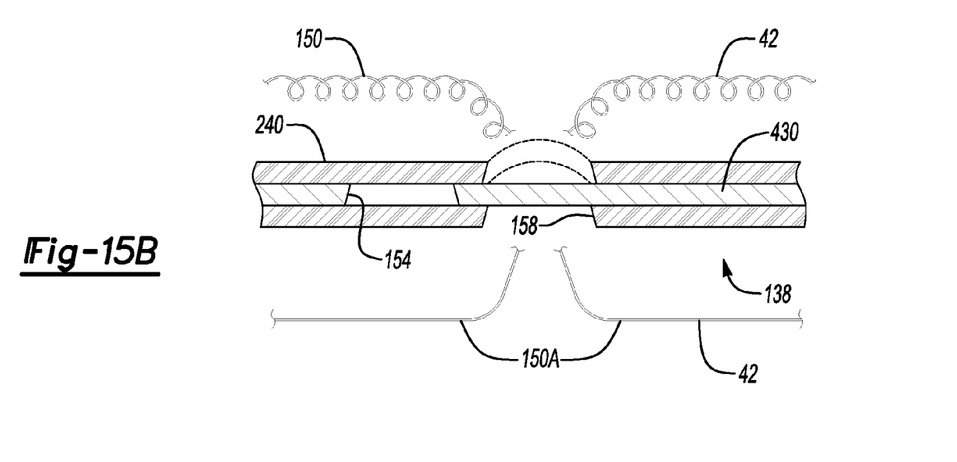
FIG. 15B is an enlarged perspective view of the seam cutter of FIG. 15 wherein the actuatable material is actuated.

Referring to FIGS. 15, 15A, and 15B, the fastener 42 may include a seam utilizing a first thread 150 and a second thread 150A. The seam cutter includes a case 240 having substantially continuous guide 422 through which the actuatable material 646 passes. The crimps 436 substantially fix the portion of the actuatable material 646 extending from the case 240 to the cutting mechanism 430. The cutting mechanism 430 is slidably engaged with the case 240 such that one or more cutting mechanism apertures 154 substantially align with one or more case apertures 158 when the actuatable material 646 is not actuated. When the actuatable material 646 is actuated, its length decreases, thereby sliding the cutting mechanism 430 within the case 240 and misaligning the cutting mechanism apertures 154 and the case apertures 158. The misalignment of the apertures 154, 158 causes the fastener 42 passing through the apertures 154, 158 to be pinched between the case 240 and the cutting mechanism 430, thereby substantially weakening or fracturing the fastener 42.

It is recognized that the cutting mechanism 430 may be of any suitable configuration. As a non-limiting example, rather than having one or more cutting mechanism apertures 154 that misalign with the one or more case apertures 158, the cutting mechanism may have a ladder-type configuration. In such an embodiment, the fastener 42 passes between the ladder "rungs" when the actuatable material 646 is not actuated. When the actuatable material 646 is actuated, the cutting mechanism 430 slides with respect to the case 240 and the ladder rungs align with the case apertures 158, thereby substantially weakening or fracturing the fastener 42.

Figure 16:
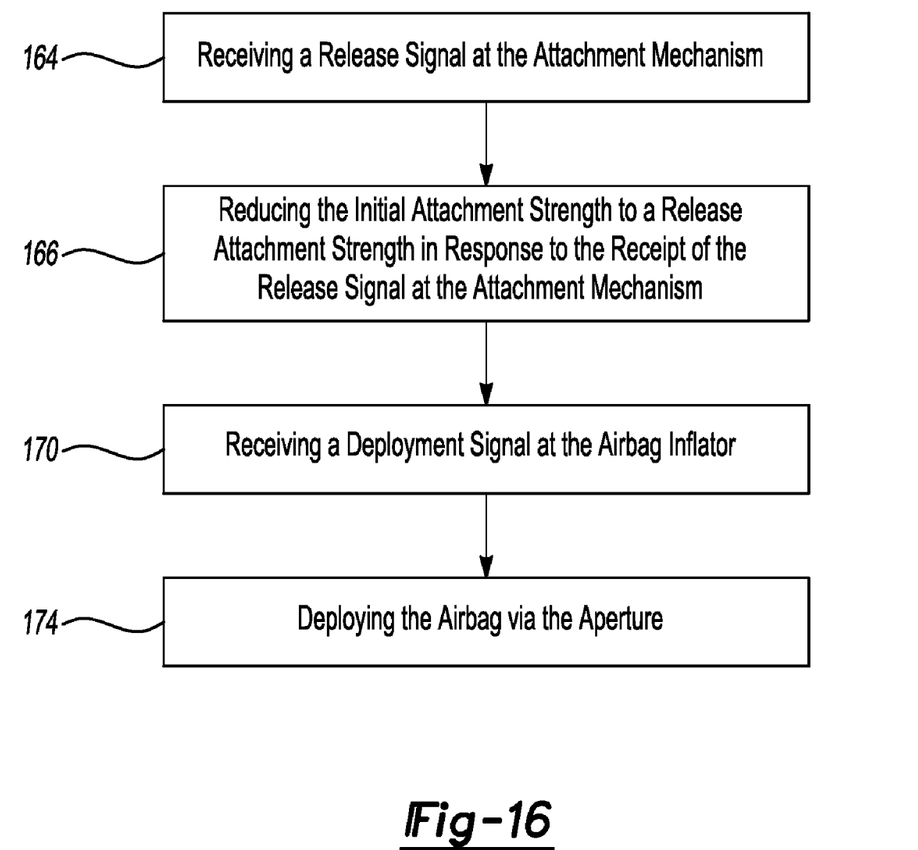
FIG. 16 is a flow diagram depicting an embodiment of a method of activating an airbag system.

FIG. 17 depicts a flow diagram of an embodiment of a method of activating an airbag system 10, 110 having an airbag housing 14 with a cavity 22 configured to store an airbag 30 deployable by an airbag inflator 82. The cavity 22 has an aperture 26, which provides an outlet for the airbag 30 during deployment, and a cover 34, 134, 234, 334 releasably attached over the aperture 26 via an attachment mechanism 38, 138, 238, 338, 438, 538, 638 having an initial attachment strength. The method generally includes receiving a release signal at the attachment mechanism 38, 138, 238, 338, 438, 538, 638, as depicted at reference numeral 164 and reducing the initial attachment strength to a release attachment strength in response to the receipt of the release signal at the attachment mechanism 38, 138, 238, 338, 438, 538, 638, as depicted at reference numeral 166. The method also includes receiving a deployment signal at the airbag inflator 82, as depicted at reference numeral 170 and deploying the airbag 30 via the aperture 26, as depicted at reference numeral 174.

As used herein, the term "fracture" is to be interpreted broadly to include any form of break. Non-limiting examples of means of fracturing include cutting, tearing, separating, softening and stretching to create one or more gaps, and/or melting. Furthermore, "at least weakening" the fastener 42, 142, 242, 342, 442, 542, 642 is to be interpreted as decreasing the strength of, as well as fracturing, the fastener 42, 142, 242, 342, 442, 542, 642.

While the best modes for carrying out the invention have been described in detail, those familiar with the art to which this invention relates will recognize various alternative designs and embodiments for practicing the invention within the scope of the appended claims.

The invention claimed is:

1. An airbag system, comprising:
   an airbag housing having a cavity configured to store an airbag, the cavity having an aperture providing an outlet for the airbag during deployment; and
   a cover releasably attached over the aperture via an attachment mechanism having an initial attachment strength, wherein the attachment mechanism is at least partially formed from at least one of a shape memory alloy, a shape memory polymer, an electro active polymer, a piezo electric, a magnetorheological elastomer, or an electrorheological elastomer;
   wherein the initial attachment strength is configured to reduce to a release attachment strength in response to receipt of a release signal at the attachment mechanism;
   wherein the release signal is provided in response to one of a preliminary impact condition, an impact condition, an occupant environment condition, or a manual input; and
   wherein the attachment mechanism is configured to increase substantially from the release attachment strength to the initial attachment strength in response to a triggering event.

2. The airbag system of claim 1 wherein the release signal is transmitted from a sensing system.

3. The airbag system of claim 1 wherein the triggering event is one of a recognition of a cessation of the receipt of the release signal at the attachment mechanism, a receipt of an attachment signal at the attachment mechanism, or a passing of a predetermined length of time.

4. The airbag system of claim 1 wherein the attachment mechanism includes at least one of a hook-and-loop type fastener, a knob-and-receiving cavity type fastener, one or more aligning tabs, one or more retaining strips, or a seam.

5. The airbag system of claim 4 wherein the attachment mechanism includes the seam, and wherein reducing the initial attachment strength to the release attachment strength includes at least substantially weakening the seam.

6. The airbag system of claim 5 wherein the attachment mechanism at least substantially weakens the seam in at least one location via at least one of: increasing tension in the seam; a direct fracture by the attachment mechanism; the attachment mechanism pulling on a ribbon system selectively sewn into the seam and configured to create at least one high stress point on the seam; or a lever system of the attachment mechanism configured to multiply a pulling motion on the ribbon system.

7. The airbag system of claim 6, further including a sheath that substantially prevents a cutting mechanism of the attachment mechanism from at least weakening the seam when in a state of non-actuation.

8. The airbag system of claim 1 wherein reducing the initial attachment strength to the release attachment strength includes activating at least one of the shape memory alloy, the shape memory polymer, the electro active polymer, the piezo electric, the magnetorheological elastomer, or the electrorheological elastomer.

9. The airbag system of claim 1 wherein the release signal is transmitted as a voltage, a current, a magnetic field, or a thermal trigger.

10. A method of activating an airbag system having an airbag housing with a cavity configured to store an airbag deployable by an airbag inflator, the cavity having an aperture providing an outlet for the airbag during deployment, and a cover releasably attached over the aperture via an attachment mechanism having an initial attachment strength, the method comprising:
    providing a release signal to the attachment mechanism in response to one of a preliminary impact condition, an impact condition, an occupant environment condition, or a manual input;
    receiving the release signal at the attachment mechanism, wherein the attachment mechanism is at least partially formed from at least one of a shape memory alloy, a shape memory polymer, an electro active polymer, a piezo electric, a magnetorheological elastomer, or an electrorheological elastomer;
    reducing the initial attachment strength to a release attachment strength in response to the receipt of the release signal at the attachment mechanism, wherein reducing the initial attachment strength to the release attachment strength includes activating at least one of the shape memory alloy, the shape memory polymer, the electro active polymer, the piezo electric, the magnetorheological elastomer, or the electrorheological elastomer; and
    either receiving a deployment signal at the airbag inflator and deploying the airbag via the aperture, or increasing the release attachment strength substantially to the initial attachment strength in response to a triggering event.

11. The method of claim 10, further comprising:
    transmitting, at a first time prior to receiving the release signal at the attachment mechanism, the release signal from a sensing system to the attachment mechanism in response to one of a preliminary impact condition, an impact condition, or a manual input; and
    transmitting, at a second time prior to receiving the deployment signal at the airbag inflator, the deployment signal from the sensing system to the airbag inflator in response to the one of the preliminary impact condition, the impact condition, or the manual input.

12. The method of claim 11 wherein the first time occurs before or substantially at the same time as the second time.

13. The method of claim 10 wherein the triggering event includes at least one of: detection, at the attachment mechanism, of a cessation of receipt of the release signal; a receipt, at the attachment mechanism, of an attachment signal; or a detection, at the attachment mechanism, of a passing of a predetermined length of time.

14. The method of claim 10 wherein the release signal is received as one of a voltage, a current, a magnetic field, or a thermal trigger.

15. The method of claim 10 wherein the attachment mechanism includes at least one of a hook-and-loop type fastener, a knob-and-receiving cavity type fastener, one or more aligning tabs, one or more retaining strips, or a seam.

16. The method of claim 15 wherein the attachment mechanism includes the seam and wherein reducing the initial attachment strength to the release attachment strength includes at least substantially weakening the seam.

17. The method of claim 16 wherein the attachment mechanism at least substantially weakens the seam in at least one location via at least one of: increasing tension in the seam; a direct fracture by the attachment mechanism; the attachment mechanism pulling on a ribbon selectively sewn into the seam and configured to create at least one high stress point on the seam; or an attachment mechanism configured to multiply a pulling motion on the ribbon.

* * * * *